(12) United States Patent
Drasovean

(10) Patent No.: US 8,665,453 B2
(45) Date of Patent: Mar. 4, 2014

(54) WORKPIECE ENGAGEMENT CHECKING APPARATUS

(75) Inventor: Leon Drasovean, London (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/532,896

(22) Filed: Jun. 26, 2012

(65) Prior Publication Data

US 2013/0342850 A1    Dec. 26, 2013

(51) Int. Cl.
  *G01B 11/24*    (2006.01)
(52) U.S. Cl.
  USPC .......................................... 356/601
(58) Field of Classification Search
  USPC .......................................... 356/601
  See application file for complete search history.

(56) References Cited

U.S. PATENT DOCUMENTS

| | | |
|---|---|---|
| 4,994,990 A | 2/1991 | Fujita et al. |
| 5,904,413 A * | 5/1999 | Ruegenberg et al. ........ 356/73.1 |
| 6,428,202 B1 | 8/2002 | Mitsuhashi et al. |
| 6,448,778 B1 | 9/2002 | Rankin |
| 6,687,639 B2 | 2/2004 | Taniguchi et al. |
| 6,765,396 B2 | 7/2004 | Barror |
| 7,607,824 B2 | 10/2009 | Chandler et al. |
| 2012/0234805 A1 * | 9/2012 | Schwarz ................... 219/121.63 |

FOREIGN PATENT DOCUMENTS

| | | |
|---|---|---|
| JP | 2001280935 A | 10/2001 |
| WO | WO2005022081 A2 | 3/2005 |
| WO | 2006024176 A1 | 3/2006 |
| WO | WO 2011/035913 * | 3/2011 |

* cited by examiner

*Primary Examiner* — Tu Nguyen
(74) *Attorney, Agent, or Firm* — Christopher G. Darrow; Young Basile Hanlon & MacFarlane P.C.

(57) ABSTRACT

An apparatus and method for measuring the engagement state of two mating work pieces, such as two parts of an electrical connector, includes a 2D scanning profile laser sensor. The laser sensor is located in a measurement position relative to the work pieces being scanned. The laser generates a two axis surface profile of the joined work pieces. The measured surface profile is compared by a controller with a reference surface profile to determine complete or non-complete engagement of the work pieces.

16 Claims, 9 Drawing Sheets

WORKPIECE ENGAGEMENT CHECKING APPARATUS

BACKGROUND

The present invention relates, in general, to methods and apparatus for checking complete engagement of mating work pieces, such as electrical connectors.

Most machines, devices and other useful apparatus are made up of an assembly of joined or interconnectable work pieces or parts. In many instances, two work pieces are formed with complimentary, interconnectable, mating portions to allow one work piece to be interconnected during the assembly of a larger apparatus into the mating portion of another work piece.

This is particularly true for electrical devices which commonly have a first portion carrying an outwardly extending plug which interconnects and mates with a complimentary shaped receptacle or socket in a second electrical connector portion.

In the case of electrical connectors, it is difficult to visually determine that the plug is fully engaged or seated in the socket as a small distance, such as one mm separation between the plug and socket, can result in a non-connected electrical circuit through the connector.

Various test methods and apparatus have been revised for checking the two mated work pieces, such as a plug and a socket of an electrical connector, are completely engaged. A simple manual test uses pull/push forces on the plug and socket to insure a complete engagement between the plug and socket. However, in complex modern day vehicle's electrical connectors can frequently located in inaccessible locations within the vehicle during the assembly of the vehicle thereby making a pull/push test difficult if not impossible to complete.

In the case of electrically powered devices, a connection test uses the application of electric power to the circuit for powering the electrical device, such as vehicle lamps, windshield wipers, power door locks, etc. However, this requires a special testing device to apply power to the specific circuit undergoing test during the vehicle assembly process before the vehicle is completely assembled and thereby able to have each circuit function checked by its own switch device within the vehicle.

However, powering a vehicle circuit on and off at the end of the vehicle assembly, while able to detect an inoperative circuit, raises additional problems since the circuit elements, the wires, the plugs and sockets and the electrical devices powered by the circuits, are typically covered up during the subsequent assembly steps thereby making repair of the electrical connections difficult and time consuming.

Other electrical connector test devices capture the audible click noise of two mating connectors. However, capturing such a low level noise or sound in a noisy vehicle assembly environment is impossible or results in inaccurate test results.

Electrical or engine wiring harness testers are also known. Such testers are elaborate and, complex and costly devices which are connected to the specific vehicle or engine harness to insure positive connectivity of all harness connection points. However, harness testers are costly and must be connected to the vehicle harnesses during the assembly process which can interfere with the assembly of the vehicle.

Thus, it would be desirable to provide an inexpensive and reliable method and apparatus for checking on the complete engagement of two mating work pieces, such as the plug in socket of an electrical connector.

2D scanning lasers have been developed which can scan surface profiles of articles, and then compare the profiled dimensions with reference profile dimensions to verify the accuracy of the manufacturing/assembly operation.

Thus, it would be desirable to develop methods and apparatus for applying 2D scanner laser technology to assembly processes to verify the interconnection of work pieces and, particularly, electrical connectors.

SUMMARY

A method for detecting complete or incomplete engagement of two mateable work pieces includes the steps of scanning two joined work pieces with a 2D scanning profile laser sensor to generate profile data of the joined work pieces, comparing the surface profile data from the laser sensor with a reference acceptable surface profile representing complete engagement of the two work pieces, and generating an output signal corresponding to one of a complete engagement or a non-complete engagement state of the two work pieces.

The method includes locating the laser sensor in a measurement position with respect to two mated work pieces.

The step of locating the laser sensor further comprises engaging at least one locator carried with the laser sensor with a surface adjacent to the two mated work pieces.

The method of activating the laser sensor comprises activating a switch carried on a holder carrying the laser sensor.

The method of scanning the joined work pieces comprises outputting by the laser sensor a representative surface profile of the two mated work pieces in the form of electrical signals representing dimensional measurements at a plurality of sample points in a laser scan line.

The method includes prestoring in a memory accessible by the controller the acceptable reference profile of the two work pieces in a complete engagement position.

The method includes comparing by the laser sensor controller, each sample point on the scan line of the scanned profile with a corresponding sample point on the reference profile.

An apparatus for detecting complete or incomplete engagement of two mateable work pieces comprises a 2D scanning laser sensor generating an output signal representative of a scanned dimensional profile of the two engaged work pieces in the form of a plurality of sample dimensional points along a laser scan line, a controller receiving the laser output signal, a controller coupled to the laser sensor and executing a control program to receive the scanned profile data from the laser sensor, and to compare the scanned profile data with a reference profile corresponding to complete engagement of the two work pieces. The controller generates an output signal representative of the complete or non-complete engagement of the two work pieces.

The apparatus includes a holder carrying the laser sensor.

The apparatus includes locator for locating the laser sensor in a measurement position with respect to the two mated work pieces.

The apparatus includes holder carrying the laser sensor and the locator carried on the holder.

A handle can be carried on the holder to facilitate manipulation of the holder. An electrical switch is carried on a handle for generating an electrical signal used to activate the laser.

The apparatus can include a programmed robot carrying the laser scanner. The robot executes a control program to position the scanning laser in at least one measurement position with respect to the two mated work pieces.

BRIEF DESCRIPTION OF THE DRAWING

The various features, advantages and other uses of the present method and apparatus for checking complete engagement of mating work pieces will become more apparent by referring to the following detailed description and drawing in which.

DETAILED DESCRIPTION

Figure 1:
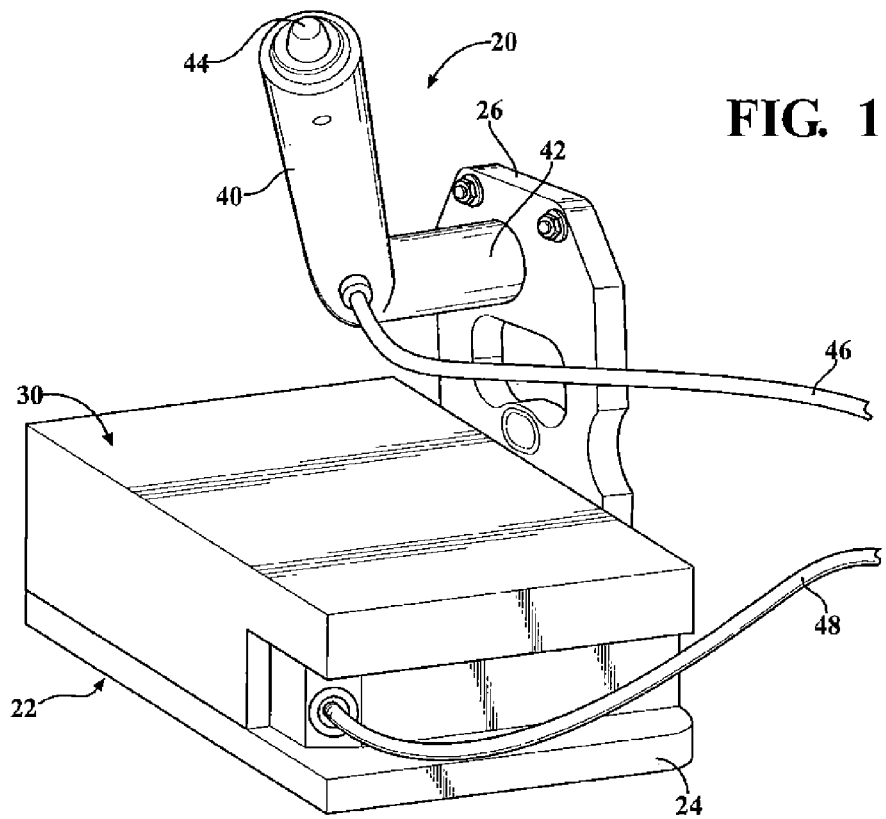
FIG. 1 is a top perspective view of one aspect of an apparatus for checking complete engagement of mating work pieces.

Referring now to the drawing and to FIGS. 1-9 in particular, there is depicted an apparatus 20 and a method for checking the engagement state of two interconnected work pieces. The apparatus 20 is configured as a manually movable apparatus. It will be understood, as described hereafter and shown in FIG. 9, that the apparatus 20 can also be implemented in an automatic control system utilizing an automatic machine, programmed robot, etc.

The apparatus 20 includes a holder 22 in the form of a rigid L-shaped bracket, for example, having a first leg 24 and a generally perpendicular oriented second leg 26. The first leg 24 contains a weight saving aperture 28. The first leg 24, which has a flat, generally plate-like shape, serves as a mounting base for a 2D scanning profile laser sensor 30. The laser sensor 30 is fixed to the first leg 24 by suitable fasteners, such as two screws which extend through apertures 32 in the first leg 24 into the housing of the laser sensor 30.

For example only, the 2D laser displacement sensor can be a LJ-G Series 2D laser displacement sensor manufactured by Keyence Corporation.

The laser sensor 30 is configured with a sensor head 34 having a selected measurement range between 15 mm to 200 mm, for example, depending upon the particular model sensor head 34 chosen for the sensor 30. The type of sensor head 34 will be selected depending upon the particular measuring application requirements.

Figure 3:
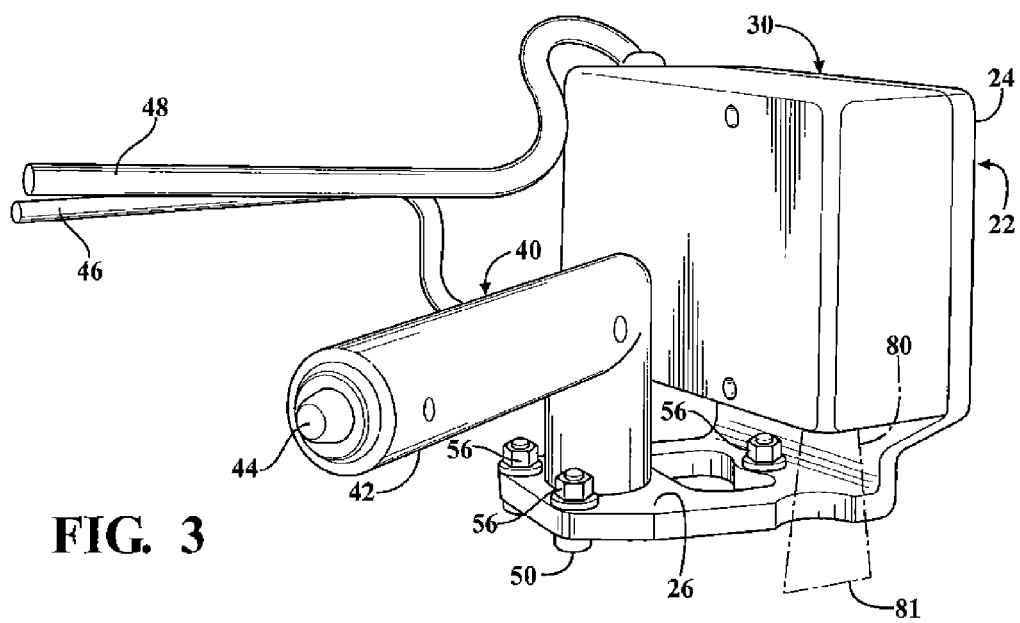
FIG. 3 is a right end elevational view of the apparatus shown in FIG. 2.

The laser sensor 30 has a high sampling speed to provide a large number of sample points across the length of the scanning laser beam 80 in FIG. 3 as the beam 80 creates a scan line 81 across the object to provide accurate dimensional measurement in the X-Z axes of the object being scanned or measured. This creates an accurate two dimensional profile of the work pieces being scanned.

A handle 40 is affixed to or integrally formed with the second leg 26 of the holder 22. An end portion 42 of the handle 40 extends generally parallel to the length of the second leg 26, by way of example only. An activation switch 44, such as a push button, mounted in the end portion 32 of the handle 40. The internal contact of the switch 44 is connected to a cable 46 which extends to a remotely located controller, as described hereafter.

A similar cable 48 extends from the laser sensor 30 to the remotely located controller.

Figure 2:
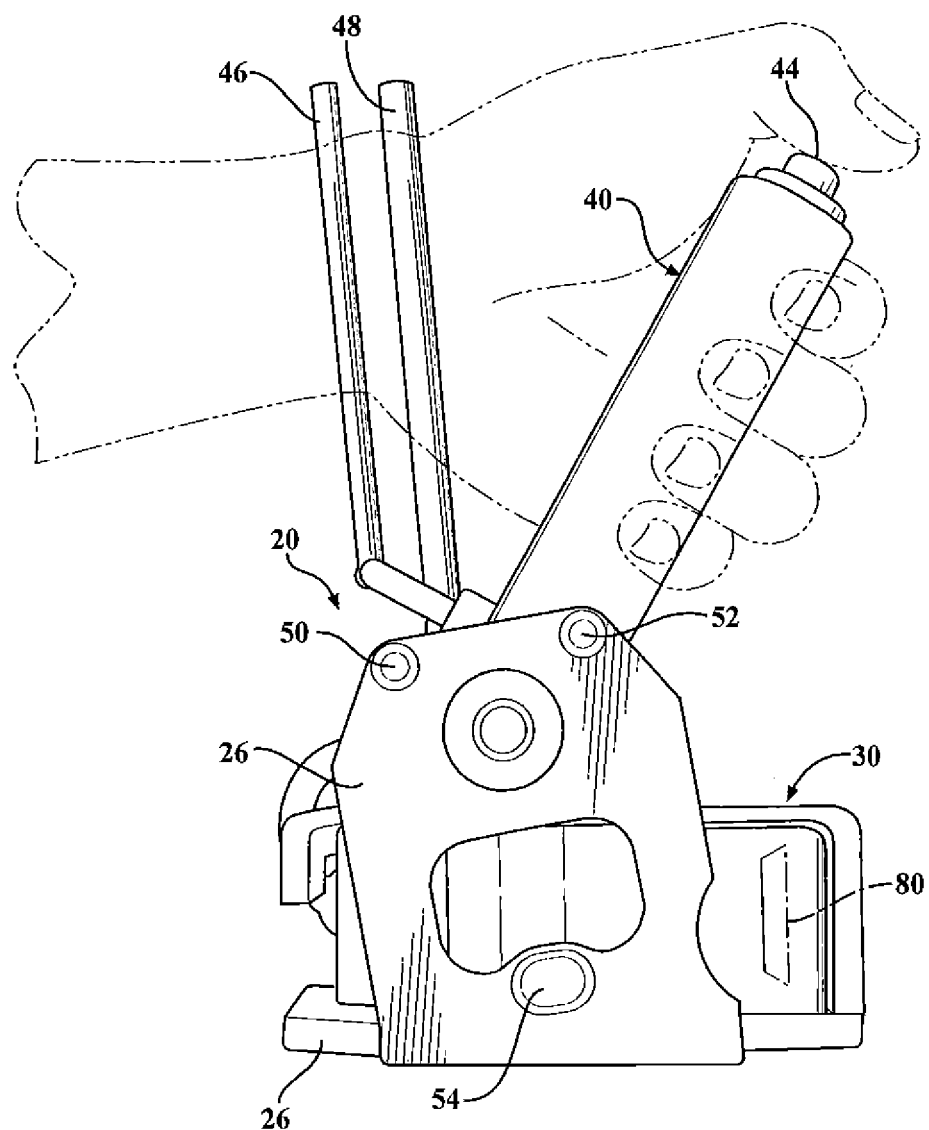
FIG. 2 is a side elevational view of the apparatus shown in FIG. 1.

Referring to FIGS. 2 and 3, the holder 22 is provided with locater means for orienting and positioning the holder 22 and thereby the laser sensor 30 in the proper position relative to the work pieces being scanned. This provides a fixed dimensional relationship between the sensor head 34 of the sensor 30 and the surface of the work pieces being scanned.

By way of example only, and depending upon the surface features adjacent to the work pieces being scanned, the locater means includes at least one or by a plurality, such as three fixed and spaced locators 50, 52 and 54 as shown in FIGS. 2 and 3. The locaters 50, 52 and 54 are in the form of projections extending outward from an exterior surface of the second leg 26 of the holder 22. The projections of the locators 50, 52 and 54 may be integrally formed as part of the second leg 26 or may be a separate attachment to the second leg 26, such as the end of a threaded shaft which is fixed in place on the second leg 26 by means of a nut 56.

The locators 50, 52 and 54 are spaced and sized for releasibly engaging recesses or apertures formed in a work pieces surface adjacent to the work pieces being scanned.

Figure 5A:
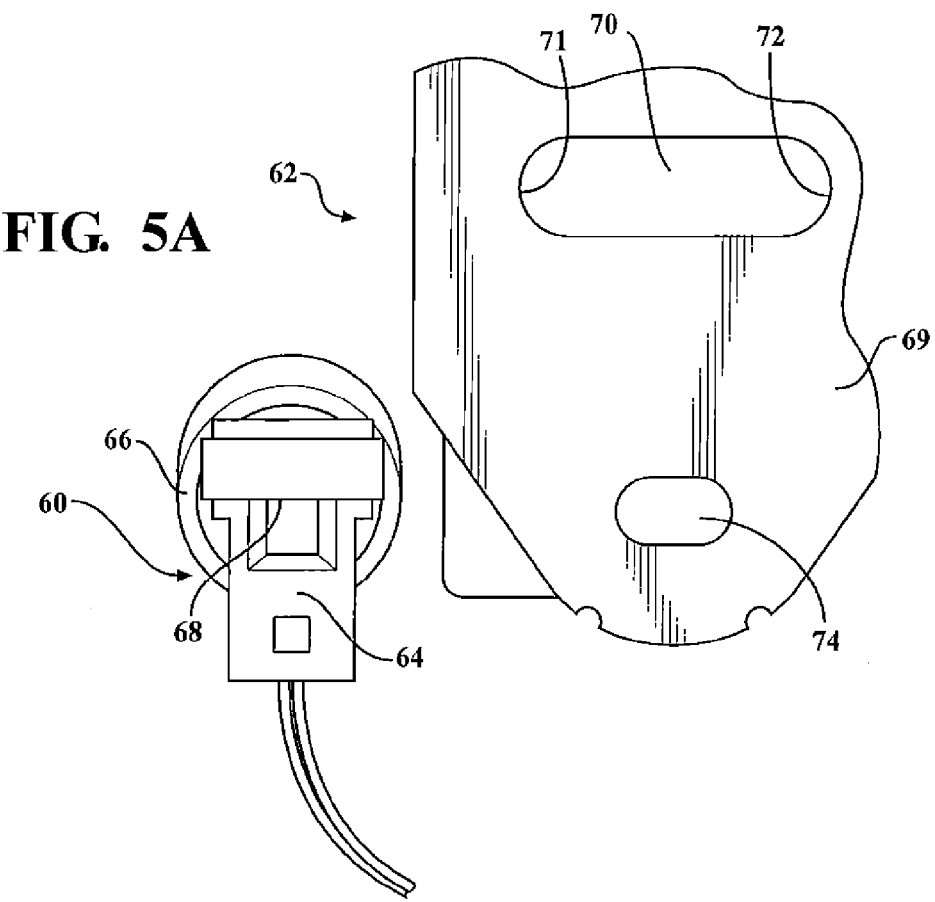
FIG. 5 is a pictorial representation of a vehicle seatbelt pretensioner electrical connector.
Figure 5B:
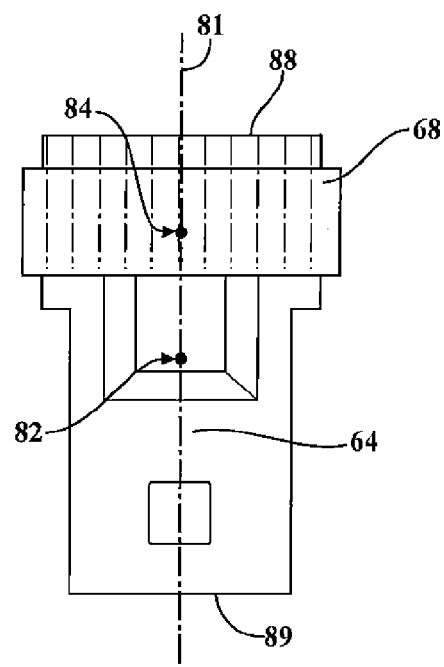
Figure 7:
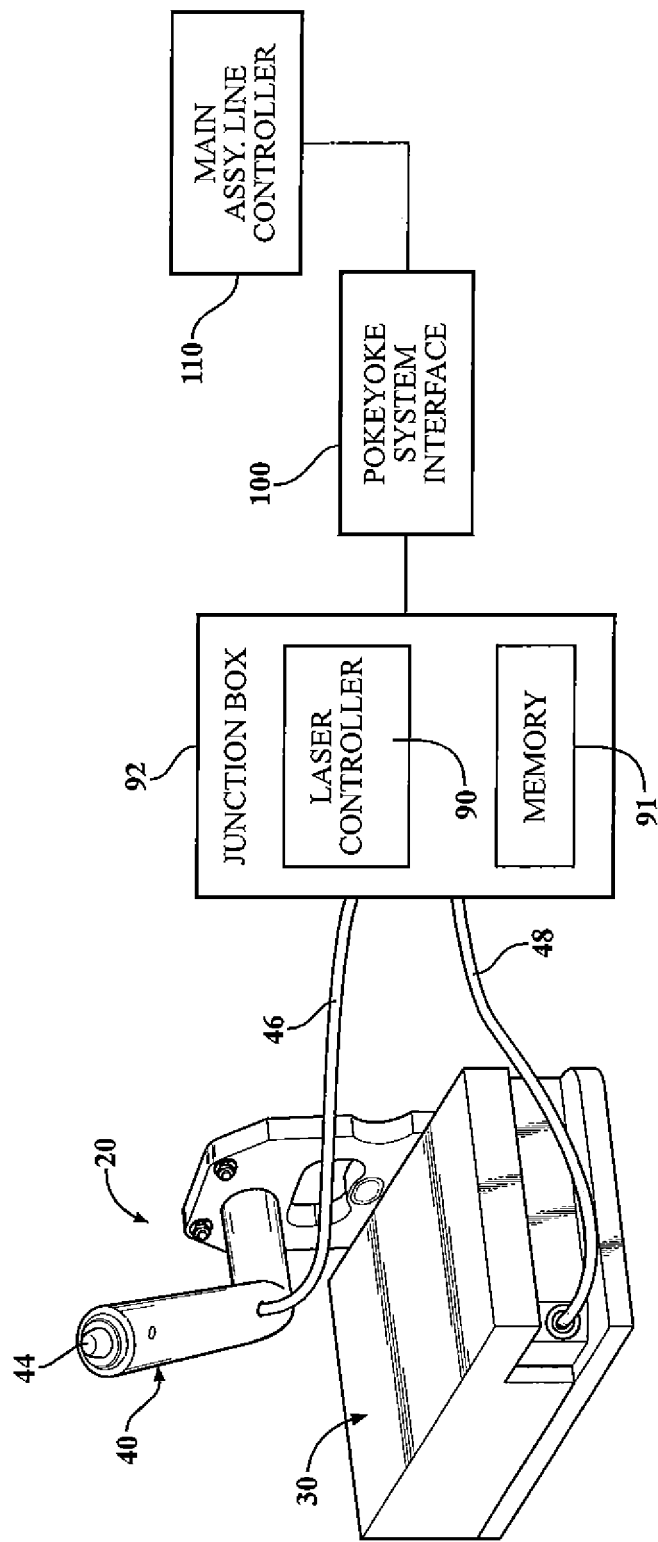
FIG. 7 is a pictorial block diagram of the electrical connections for the apparatus shown in FIG. 1.

As shown by way of example only in FIGS. 5A and 5B, one application of the apparatus 20 is to determine if a two part electrical connector 60 is fully and completely engaged. The electrical connector portion of a seatbelt pretensioner 62 is depicted in FIG. 5A. The connector 60 includes a first connector portion or plug 64 which mounts in a receptacle or socket 66. A lock member or lock clip 68 is carried on the plug 64 and is repositional on the plug 64 from a first generally loose position to a second engaged position. In the engaged position, the lock member or clip 68 locks the plug 64 in the socket 66.

A support member 69 is located adjacent to the receptacle or socket 66. A plurality locating surfaces, such as ends 71 and 72 of a slot 70 and a spaced slot 74 are formed in the support 69. As can be easily seen, the locator projections 50, 52 and 54 are sized and dimensionally spaced apart to respectively fixedly engage the corresponding ends 70 and 72 and the aperture 74 in the support member 69. In this manner, the holder 22 can be properly fixed in a measurement position relative to the connector 60 for determining if the connector parts 64 and 66 are completely engaged.

Figure 4:
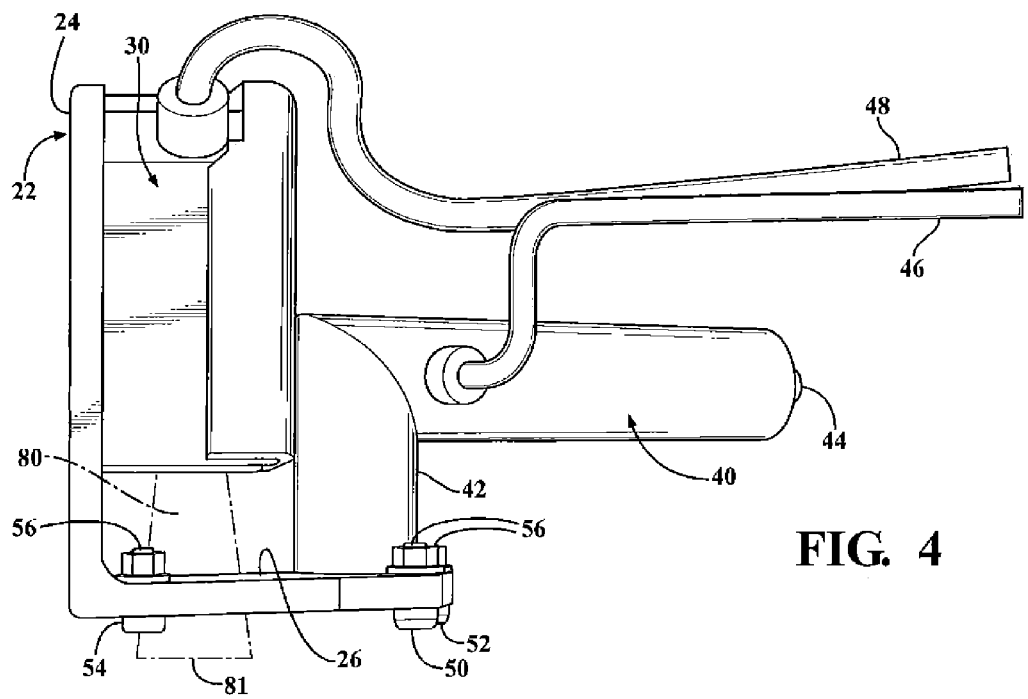
FIG. 4 is a rear elevational view of the apparatus shown in FIG. 2.
Figure 6:
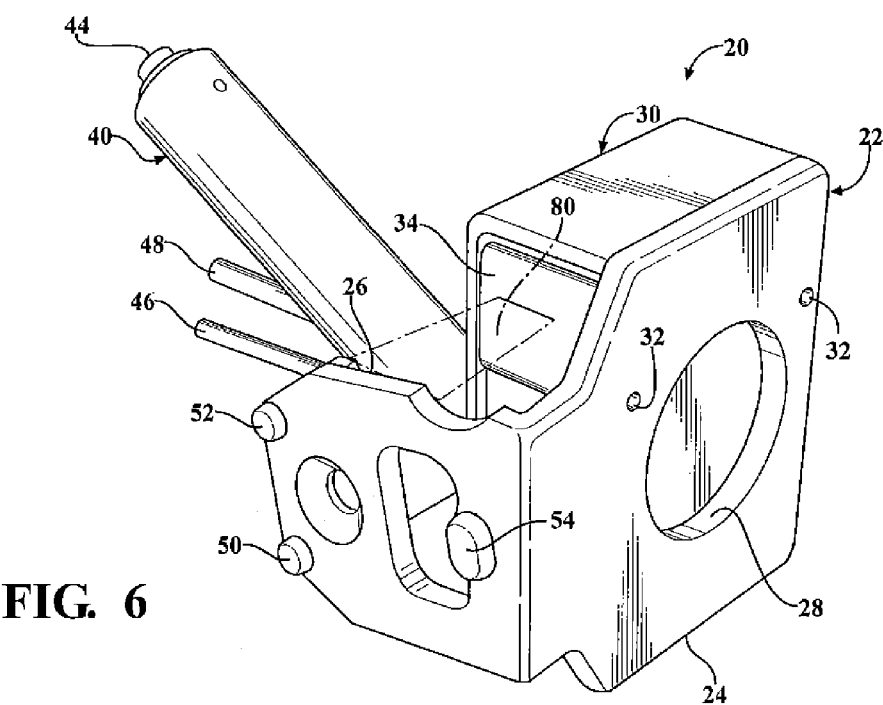
FIG. 6 is a perspective view showing the measurement location position of the apparatus with respect to the seatbelt pretensioner electrical connector shown in FIG. 5.

In use, an operator will grasp the end portion 42 of the handle 40 and advance the holder 22 toward the work pieces until the locator members 50, 52, and 54 securely seat within the corresponding locating surfaces 70, 72 and 74 in the support member 69. In this position, as shown in FIGS. 3 and 4, the 2D laser scanner 30 has its sensor head 34 oriented toward and facing the connector 60.

The operator then depresses the push button 44 which sends a signal through the cable 46 to a controller 90 which in turn transmits a signal through the other cable 48 to activate the laser sensor 30. When activated, the laser sensor 30 generates a moving beam 80 which scans the joined connecter parts 64 and 68 creating a plurality of sample points along a scan line 81 having dimensions along the X and Z axes of the two parts 64 and 66. In this measurement orientation, as shown in FIG. 5B, the laser scan beam 80 scans vertically from the top edge 88 of the joined plug 64 and lock clip 68 to the bottom edge 89 of the plug 64, the lock clip 68 and the socket 66 generating the scan line 81. In the scan line 81, the laser sensor 30 generates a plurality of spaced sample points and creates dimensional measurements along the X and Z axes for each sample point along the scan line 81.

These dimensional signals are output by the sensor laser 30 through the cable 48 to the remotely located controller 90 in the junction box 92, which accumulates the sample points on the scan line 81 into a composite dimensional profile of the scanned connector 60. The controller 90 executes a control program to compare scanned profile with a reference profile which has been prestored in a memory 91 accessible by the controller 90. Sample scans are pictorially shown in FIGS. 8B, 9B and 10B on a monitor which may optionally be provided in the junction box 92 housing the controller 90.

Since the dimensional measurements are taken along both X and Z axes, the control program executed by the controller 90 is capable of detecting non-complete engagement or misalignment of the clip 68 relative to the plug 64 or a non-complete engagement of the plug 64 in the socket 66.

The controller 90, which can be a Keyence LJ-G series controller, then compares the dimensions of the profile of the connector 60 generated by the laser sensor 30 with a reference dimensional profile stored in the memory 91 accessible by the controller 90.

Figure 8A:
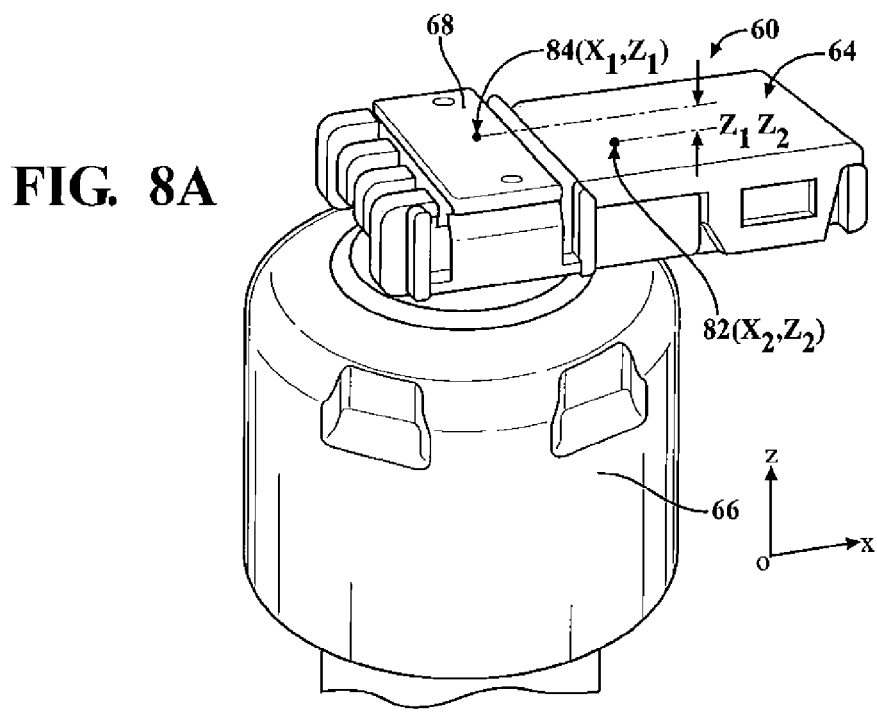
FIG. 8A is a perspective view of the vehicle seatbelt pretensioner electrical connector shown in a fully plugged and locked position.
Figure 8B:
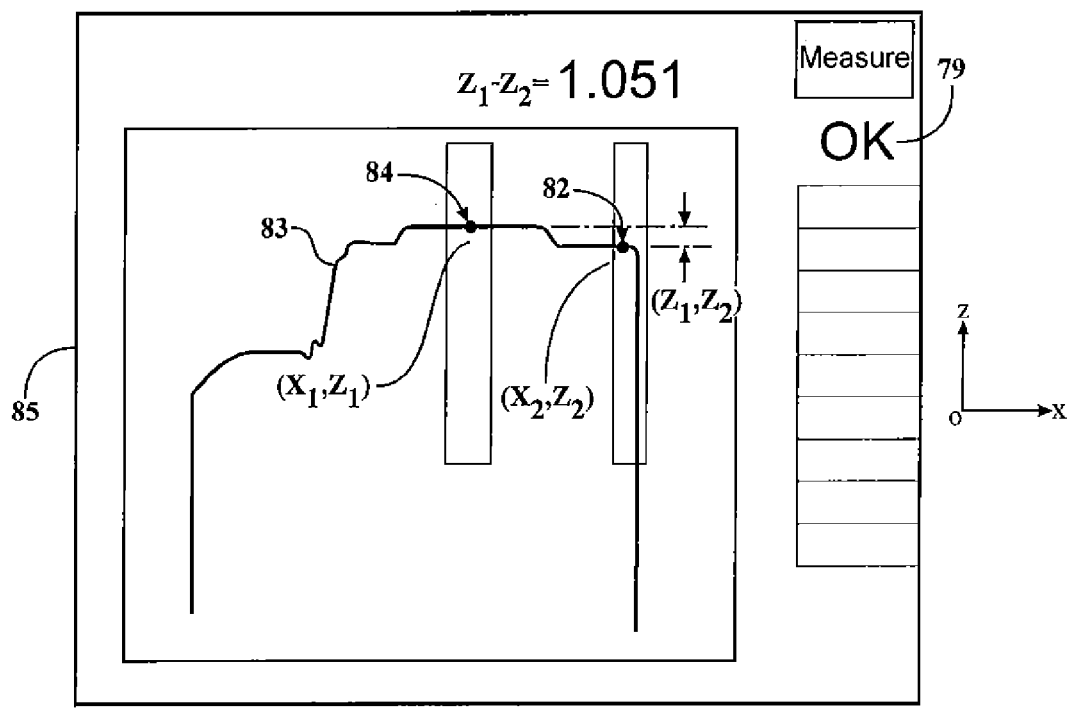
FIG. 8B is a pictorial representation of a screen display showing the measurement comparison by the laser controller of the connector state shown in FIG. 8A.
Figure 9A:
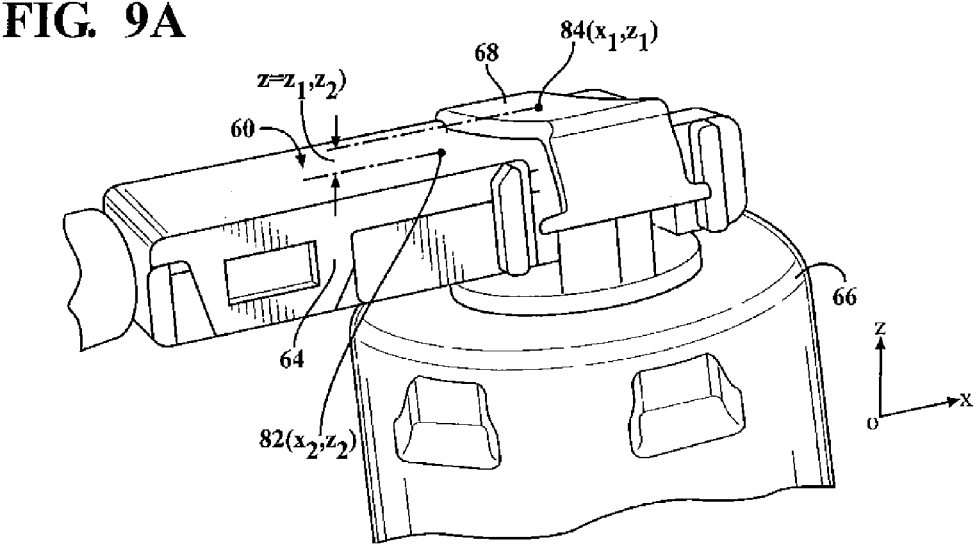
FIG. 9A is a side elevational view of the vehicle seatbelt pretensioner electrical connector similar to that depicted in FIG. 8A; but shown in a position where the connector is only partially plugged into the plug.
Figure 9B:
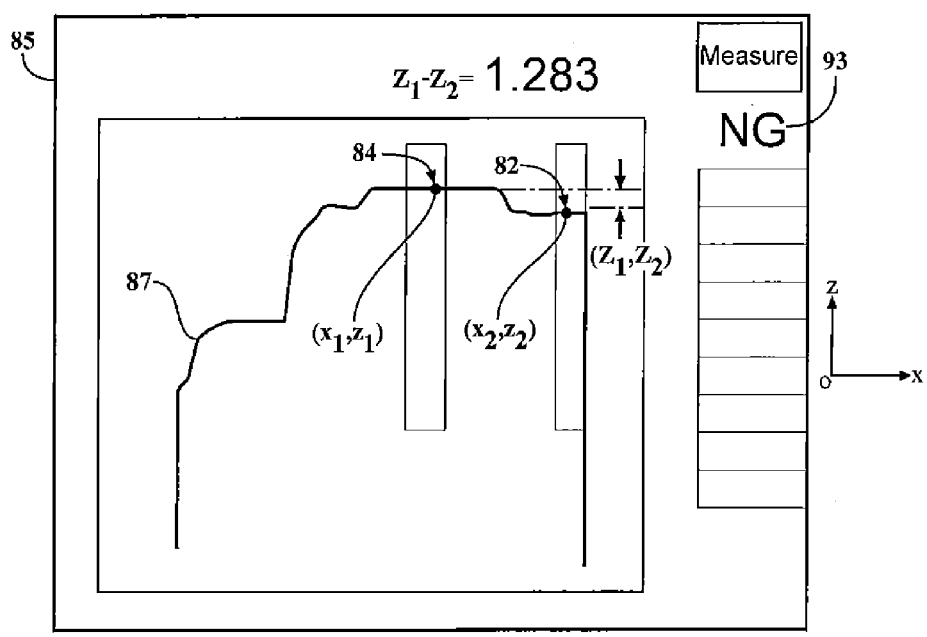
FIG. 9B is a pictorial representation of a screen display showing the measurement comparison by the laser controller of the connector state shown in FIG. 9A.

The controller 90 executes a stored program to compare the profile dimensions at each sampled point in the profile and with the reference dimension at each sample point and generates a difference measurement as shown in the large numbers on the screens in FIGS. 8B and 9B. The controller 90 is programmed with a dimensional tolerance range for each sample profile point.

In FIG. 8A, the plug 64 is fully engaged with the socket 66 and the lock clip 68 is fully seated on the plug 64. The laser controller 90 compares the sample profile points in the X and Z axes and compares each sample point dimension with the corresponding sample point dimension of a reference, acceptable profile of the plug 64, the socket 66 and the lock clip 68.

The laser controller 90 is capable of generating the measured surface profile 83 on a display screen 85, as shown in FIG. 8B. Two particular measured sample points 82 and 84 on the profile have an acceptable dimension of 1.051 mm between their $Z_1$ and $Z_2$ coordinates. This is the $Z=Z_1-Z_2$ dimensional coordinate position of the point 82 of the connector body relative to the position of the point 84 of the lock clip 68. The 1.051 mm dimension indicates that the plug 64 has the lock clip 68 fully pressed in.

The laser controller 90 then generates an OK or Good signal indicated by reference number 79 on the screen display 85.

FIG. 9B depicts the surface profile 87 of the connector 60 shown in FIG. 9A when the lock clip 68 is not fully locked in the plug 64. In this state, the same sample profile point 82 has a larger dimension of 1.283 mm. This larger dimension is outside of the acceptable tolerance range for the sampled profile point 82 such that the controller 90 generates a no good ("NG") signal 89. The ("NG") signal is transmitted by the controller 90 to the work station quality control system interface 100. The quality control system interface 100 can generate an audible and/or visual alarm in the form of a buzzer, bell and/or flashing light to indicate that a "NG" condition has been detected or simply display any indication of the connection or work pieces involved in the "NG" condition. This allows for prompt corrective action, such as a reorientation of the lock member 68 relative to the plug 64 or a disconnection of the plug 68 and the lock member 68 from the socket 66 and then a complete reconnection until a good ("G") condition is detected by the controller 90.

FIG. 9A depicts an error or "NG" state of the lock clip 68 relative to the plug 64. As shown in FIG. 9A, the plug 64 is fully seated or plugged into the socket 66. However, the right edge of the lock clip 68 is not fully pressed into the plug 64 and does not fully lock the plug 64 in the socket 66. The results in a slight elevation of the height of the right edge of the lock clip 68 caused by the gap 91 between the fully engaged or seated position of the right edge of the lock clip 68 in the plug 64 and the raised position shown in FIG. 9A.

This height differential $Z=Z_1-Z_2$ will be detected by the laser controller 90 during the comparison of the measured and referenced surface profiles and results in a "NG" signal 93 shown in the display 85 in FIG. 9B.

It will be understood that the non-fully seated condition of the lock clip 68 relative to the plug 64 also includes both side edges of the lock clip 68 not being fully pressed into the plug 66 as well as the opposite or left edge of the lock clip 68 not being fully pressed into the plug 64.

Figure 10A:
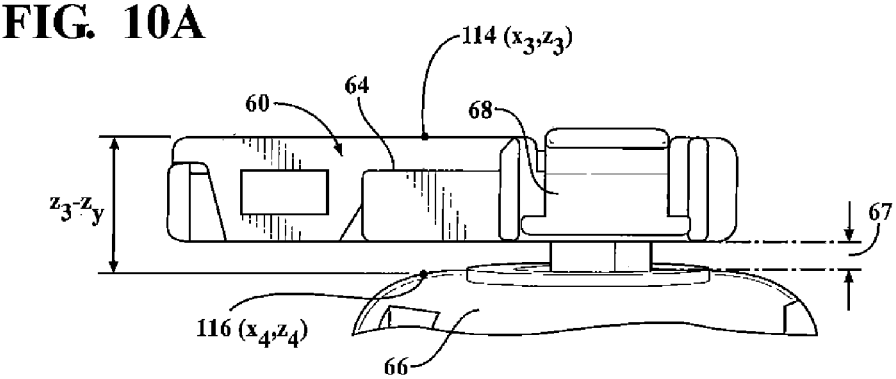
FIG. 10A is a side elevational view of the vehicle seatbelt pretensioner electrical connector shown in another non-fully engaged state.
Figure 10B:
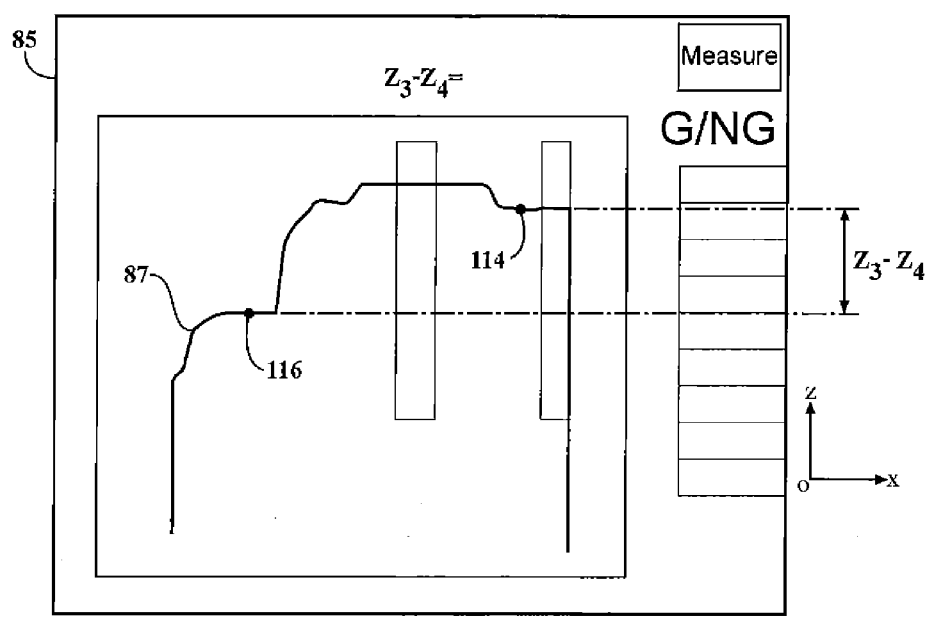
FIG. 10B is a pictorial representation of a screen display showing the measurement comparison by the laser controller of the connector state shown in FIG. 10A.

FIG. 10A depicts the connector 60 in a state or position where the lock clip 68 is fully engaged or seated on the plug 64; but the plug 64 is only partially plugged into the socket 66. A slight gap 67 exists between the inner surface of the plug 64 and the outer edge of the socket 66. This gap or dimension 67 can be detected by laser controller 90 during the comparison of the measured surface profile and the reference acceptable surface profile.

The height differential corresponding to the gap or dimension 67 ($Z=Z_3-Z_4$) is calculated by the laser controller 90 between the elevation dimension of the sample points 114 and 116 on the plug 64 and the outer surface of the socket 66. The elevation difference between the measured and referenced elevation dimensions of the sample points 100 and 102 is shown graphically in FIG. 10B. The laser controller 90 will generate a "G" or "NG" signal in the same manner as described above.

It should be noted that the single sequence of operation of the laser sensor 30 along the left profile surface of the lock clip 68 and the plug 64 can provide an indication of one or both of two non-fully engagement states of the lock clip 68 relative to the plug 64 or socket 66 or the plug 64 relative to the socket 66. In this manner, the apparatus 20 provides an indication of the complete or non-engagement state of the connector 60 relative to the socket 66.

It should also be noted that the above-described apparatus can also be used to measure the fully inserted or non-inserted portion of a conventional electrical connector plug having one or more end terminals or prongs projecting inline from the end of the plug body with respect to the mating socket or receptacle. In determining the connection state of such a two part plug and socket, the laser sensor 30 could be oriented to scan horizontally from one end of the plug body to the other end of the socket or transversely from the left edge of the plug and socket to the right edge of the plug and socket.

The method and apparatus can also be used to nut/bolt assemblies, grommets and plugs.

Either the "G" or "NG" signal is transmitted by the quality control system 100 to the main assembly line controller 110 for recordation, error location for subsequent correction, quality control reports, etc.

Figure 11:
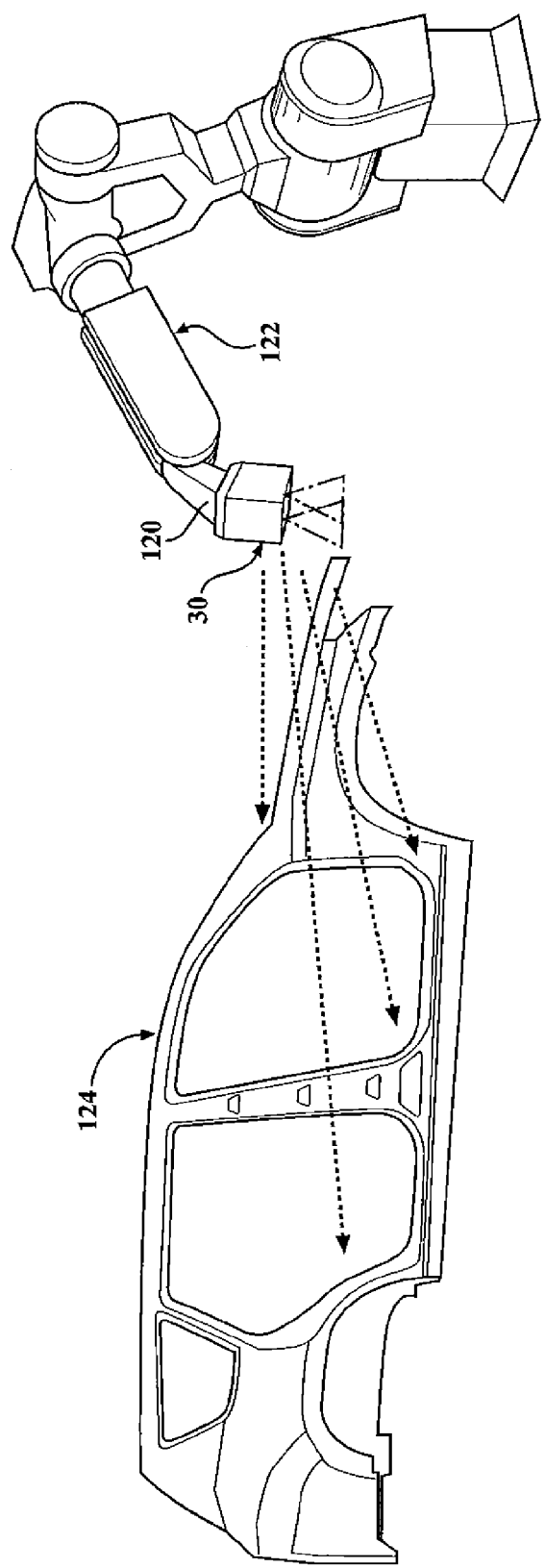
FIG. 11 is a pictorial representation of another aspect of an apparatus for checking engagement of mating work pieces mounted on an end effector of a programmed robot.

Referring to FIG. 11, the 2D laser scanning sensor 30 can be mounted on an end effector 120 of a programmed robot 122. A holder similar to the holder 22 may be provided to provide a secure attachment of the laser sensor 30 to the end effector 120. However, the locator means 50, 52 and 54 may not be required since the robot 122 via encoders or sensors at its various articulated joints knows the dimensional coordinates in space of the end effector 120 and thereby the laser sensor 30 relative to the known coordinate points of the objects to be measured.

The use of the programmed robot 122 allows a 2D laser scanning profile to be generated and compared with reference profiles for a number of different connections, such as electrical connections, mating connections between two parts on the vehicle body, etc., at a plurality of different locations in the vehicle body 124 in a single work station.

What is claimed is:

1. A method for detecting complete or incomplete engagement of two mateable work pieces, comprising:
    prestoring reference acceptable surface profile dimensional data of an exterior surface of at least one of two engageable work pieces representing the two work pieces in a complete engagement position, wherein the surface profile dimensional data varies if the two work pieces are fully engaged or not fully engaged;
    engaging the two mateable work pieces;
    locating a scanning profile laser sensor and the two engaged workpieces in a measurement relationship;
    scanning an exterior surface of at least one of the two engaged work pieces with the scanning profile laser sensor to generate surface profile dimensional data of the exterior surface of at least one of the two engaged work pieces;
    comparing the scanned surface profile dimensional data with the pre-stored reference acceptable surface profile dimensional data representing a complete engagement position of the two work pieces; and
    generating, based on the comparison, an output signal corresponding to one of a complete engagement state or a non-complete engagement state of the two work pieces.

2. The method of claim 1 wherein the step of locating the laser sensor further comprises:
    engaging at least one locator carried with the laser sensor with a surface associated to the two engaged work pieces.

3. The method of claim 1 further comprising:
    activating the laser sensor.

4. The method of claim 3 wherein the step of activating the laser sensor comprises:
    activating a switch carried on a holder carrying the laser sensor.

5. The method of claim 1 wherein the step of scanning the engaged work pieces comprises:
    outputting by the laser sensor a representative surface profile of the two engaged work pieces in the form of electrical signals representing dimensional measurements at a plurality of sample points in a laser scan line.

6. The method of claim 5 further comprising:
    comparing, by a controller, each sample point on the laser scan line of the scanned profile with a corresponding sample point on the reference acceptable profile.

7. The method of claim 6 wherein the comparing step comprises:
    prestoring the reference the most surface profile dimensional data at a plurality of sample points along the reference acceptable surface profile corresponding the two engaged workpieces in a fully engaged position.

8. The method of claim 7 further comprising:
    detecting a difference between the reference acceptable surface profile dimensional data sample points and the measured surface profile dimensional data sample points.

9. The method of claim 8 further comprising:
    generating the output signal corresponding to a complete engagement state or a non-complete engagement state by comparing the difference with an acceptable tolerance range.

10. An apparatus for detecting complete or incomplete engagement of two mateable work pieces comprising:
    a laser sensor generating an output signal representative of a scanned dimensional profile of the two engaged work pieces in the form of a plurality of sample dimensional points along each of a plurality of laser scan lines;
    a 2D scanning profile laser sensor to generate profile data of two joined work pieces;
    a controller executing a control program comparing a reference surface profile of complete engagement of the two work pieces with the surface profile from the laser sensor; and
    the controller generating an output signal representative of the determined completely engagement or non-complete engagement state of the two work pieces.

11. The apparatus of claim 10 further comprising:
    a holder carrying the laser sensor.

12. The apparatus of claim 11 further comprising:
    a handle carried on the holder to facilitate manipulation of the holder.

13. The apparatus of claim 12 further comprising:
    an electrical switch carried on a handle for generating an electrical signal used to activate the laser.

14. The apparatus of claim 10 further comprising:
    a locator for locating the laser sensor the two engaged work pieces in a measurement position.

15. The apparatus of claim 14 further comprising:
    a holder carrying the laser sensor; and
    the locator carried on the holder.

16. The apparatus of claim 10 further comprising:
    the programmed robot carrying the laser scanner;
    the robot executing the controlled program to position the scanning laser in at least one measurement position with respect to the two mated work pieces.

* * * * *

UNITED STATES PATENT AND TRADEMARK OFFICE
CERTIFICATE OF CORRECTION

| | | |
|---|---|---|
| PATENT NO. | : 8,665,453 B2 | Page 1 of 1 |
| APPLICATION NO. | : 13/532896 | |
| DATED | : March 4, 2014 | |
| INVENTOR(S) | : Leon Drasovean | |

It is certified that error appears in the above-identified patent and that said Letters Patent is hereby corrected as shown below:

In the Claims

In column 8, line 13, after "corresponding", please insert --to--.

Signed and Sealed this
Eighth Day of July, 2014

Michelle K. Lee
*Deputy Director of the United States Patent and Trademark Office*